United States Patent [19]
Suzuki et al.

[11] Patent Number: 5,522,360
[45] Date of Patent: Jun. 4, 1996

[54] INTAKE CONTROL VALVE

[75] Inventors: Mitso Suzuki; Masahiro Ito; Yoshiyuki Higaki, all of Iwata, Japan

[73] Assignee: Yamaha Hatsudoki Kabushiki Kaisha, Iwata, Japan

[21] Appl. No.: 475,565

[22] Filed: Jun. 7, 1995

Related U.S. Application Data

[62] Division of Ser. No. 91,605, Jul. 13, 1993.

[30] Foreign Application Priority Data

Jul. 14, 1992 [JP] Japan .................................. 4-186501

[51] Int. Cl.⁶ .......................................................... F02P 5/00
[52] U.S. Cl. ............................................. 123/329; 123/308
[58] Field of Search ................................... 123/308, 432, 123/329

[56] References Cited

U.S. PATENT DOCUMENTS

| | | |
|---|---|---|
| 4,320,725 | 3/1982 | Ruchlik et al. . |
| 4,760,821 | 8/1988 | Aupor et al. . |
| 4,766,853 | 8/1988 | Iwanami . |
| 4,932,378 | 6/1990 | Hitomi et al. . |
| 4,974,566 | 12/1990 | LoRusso et al. . |
| 5,167,211 | 12/1992 | Fukuma et al. . |
| 5,255,649 | 10/1993 | Isaka . |
| 5,311,848 | 5/1994 | Isaka et al. . |
| 5,335,634 | 8/1994 | Hashimoto et al. . |

FOREIGN PATENT DOCUMENTS

| | | |
|---|---|---|
| 0071179 | 2/1983 | European Pat. Off. . |
| 0352657 | 1/1990 | European Pat. Off. . |
| 3500774 | 2/1986 | Germany . |
| 3638021 | 5/1987 | Germany . |
| 2196388 | 4/1988 | United Kingdom . |

OTHER PUBLICATIONS

Europe Search Report dated Nov. 18, 1993.
Patent Abstracts of Japan, vol. 9, No. 114 (M-380) (1837) 18 May 1985 & JP-A-60 1 335 (Nissan Jidosha KK) 7 Jan. 1985.
Patent Abstracts of Japan, vol. 15, No. 329 (M-1149) 21 Aug. 1991 & JP-A-31 24 903 (Yamah Motor Co., Ltd.) 28 May 1991.

*Primary Examiner*—Erick R. Solis
*Attorney, Agent, or Firm*—Knobbe, Martens, Olson & Bear

[57] ABSTRACT

Control arrangements for the induction system of an internal combustion engine having a control valve in the induction passage which is moveable between an opened position wherein the flow into the combustion chamber is unrestricted and in a first direction and in closed position wherein the flow into the combustion chamber is restricted to accelerate the velocity of the charge entering the combustion chamber and change its direction from the first direction. Optimum positions are set for the control valve in response to engine speed and engine load but the control valve is held in a closed position when the engine speed is below a predetermined speed and regardless of the load and is also held in an opened position when the engine speed is above a second predetermined speed and regardless of load. Various routines are shown for positioning the control valve to accommodate catalytic convertor warm up, sudden acceleration or deceleration conditions and other transient conditions. In addition, the spark timing for the engine is also controlled in response to the operation of the control valve.

20 Claims, 5 Drawing Sheets

INTAKE CONTROL VALVE

This application is a divisional of U.S. patent application Ser. No. 08/091,605, filed Jul. 13, 1993, by the same inventor.

BACKGROUND OF THE INVENTION

This invention relates to an intake control valve for an internal combustion engine and more particularly to an improved method of operating such a control valve so as to optimize engine performance under a wide variety of conditions.

As is well known, many facets in the design and construction of internal combustion engines represent a compromise between maximum efficiency, maximum power and good running under widely varying conditions. The induction system is a prime example where such compromises may be required. When running at low speeds and low loads, it is desirable to induce a large turbulence to the charge that enters the combustion chamber so as to insure rapid flame propagation and full combustion. Although a wide variety of constructions and techniques have been employed for introducing such turbulence to the induction system, these turbulence inducing devices all substantially restrict the ability of the engine to breath under high speed, high load conditions.

There have, therefore, been proposed arrangements that incorporate a control valve in the induction passage which has the effect of not only changing the cross sectional area and, accordingly, the velocity of the charge entering the combustion chamber but additionally varying the direction in which the charge enters the chamber. Such devices can improve the efficiency of the engine at low and mid ranges without adversely affecting the high performance characteristics of the engine. Examples of such flow controlling induction systems may be found in the co-pending applications of Yoshiharu Osaka entitled "Tumble Control Valve For Intake Port", Ser. No. 834,604, filed Feb. 12, 1992 and "Intake Air Control System For The Engine", Ser. No. 893,111, filed Jun. 3, 1992, which applications are assigned to the Assignee hereof.

The constructions shown in those patent applications are extremely effective in providing good running over a wide variety of engine running characteristics. It has been found, however, that the performance of the engine both in the terms of exhaust emission control, fuel economy and engine output performance can vary significantly with the position of the control valve. Said another way, it has been found that the optimum position of the control valve for given running conditions varies with a number of parameters.

It is, therefore, a principal object to this invention to provide an improved induction control system for an engine.

It is a further object to this invention to provide an improved engine induction system incorporating a control valve and an improved arrangement for positioning the control valve.

In connection with the control of control valves of the type shown in the aforenoted patents, it has also been found that under certain ranges of engine running conditions there is an advantage in maintaining the control valve in either its flow restricting or its fully opened position, even though this condition may not be the optimum for the actual engine condition. By maintaining the control valve in one of its positions under a range of running operations, it has been found possible to improve fuel economy and/or performance depending upon other characteristics of the engine.

It is, therefore, a still further object to this invention to provide an improved induction system incorporating a control valve and a strategy for maintaining the control valve in one of its positions during a range of engine conditions.

With spark ignited engines, it is also a practice to vary the timing of firing of the spark plug in response to engine running conditions, most normally engine speed and/or load. For example, under low speed, low load conditions the spark is normally fired at an advanced condition so as to insure that full combustion can occur at the appropriate time. However, as the speed of the engine increases, the amount of spark advance is normally retarded from the low speed condition although the spark plug is always fired before top dead center. Of course, the optimum spark timing will vary depending upon a number of factors.

It has been further found that if conventional spark timing is employed in conjunction with an engine having an induction system control valve, then under some ranges of control valve operation the spark timing may not be optimum. For example, it has been the practiced, as noted above, to advance the spark timing when operating at low speed, low load conditions because of the low rate of flame propagation in the combustion chamber. However, when a control valve is employed for redirecting the charge and creating turbulence in the combustion chamber, then the conventional spark timing will not be appropriate.

It is, therefore, a still further object to this invention to provide an improved spark control arrangement for an engine having a control valve wherein the spark timing is varied in relation to the control valve position.

Although it may be possible, as previously noted, to determine the optimum position of the induction control valve for given running conditions, transient conditions present a different type of problem. For example, under high speed, high load conditions it is normally desirable to maintain the control valve in its opened position while under low speed, low load conditions it is desirable to maintain the control valve in its closed or flow controlling position. However, when decelerating from a high speed, high load condition due to rapid closure of the throttle valve or a sudden decrease in operator demand, then the throttle valve or operator throttle control will indicate a low speed, low load condition while the engine is still operating at high speed. Under such conditions, it has been desirable to maintain the control valve in its fully opened position even though the speed control position may indicate a different running condition.

It is, therefore, a still further object to this invention to provide an induction system having a control valve and improved strategies for operating to provide better performance under certain types of transient conditions.

In addition to the positioning of the control valve under extreme deceleration conditions, as aforenoted, it is also desirable to change the spark timing when the control valve is held in its fully opened position and independently of the other sensed engine conditions so as to improve fuel economy.

It is, therefore, a still further object to this invention to provide an improved spark control system for an engine having a control valve in its induction system and which control valve is held in one position in response to a sudden change in operator demand.

Another condition when the positioning of the control valve may be determined primarily by one engine condition other than those normally sensed, is when the engine is stopped. Normally when the engine is stopped, the throttle control will be positioned in a position that would call for the control valve also to be positioned in its flow restricting position. Depending upon the geometry of the induction system and the type of charge former employed, such closure of the control valve could trap residual condensed fuel in an upstream location in the induction system. This trapped fuel could give rise to certain problems when the engine is being restarted. On the other hand, there may be some types of engine configurations or some conditions when it is desirable to maintain the control valve in its closed position when the engine is shut off.

It is, therefore, a still further object to this invention to provide an improved arrangement for operating the control valve upon the stopping of the engine to place it in one of extreme positions and regardless of the other engine conditions which may be sensed.

As has already been noted, during starting of the engine and when operating at low speeds and low loads, it is desirable to position the control valve in a closed or flow restricting position so as improve turbulence and redirect the air flow in the combustion chamber. However, there may be some instances when even this is not desirable.

For example, if the engine is provided with a catalytic convertor or other type of device for treating the exhaust gases, it is desirable to insure that this exhaust treatment device is at its operating temperature or brought to that temperature quickly during cold starting and warm up. This is because catalytic convertors must be at their operating temperature before they become effective. Thus, under some cold start up conditions it may be desirable to promote other than the best combustion efficiency in the engine so that a fuel rich mixture may be delivered to the catalytic convertor so as to cause it to heat more rapidly.

It is, therefore, a still further object to this invention to provide an improved induction system and control device therefore that will assist in cold starting warm up.

SUMMARY OF THE INVENTION

Various features of the invention are all adapted to be embodied in an internal combustion engine that has a combustion chamber and an intake passage that communicates at a valve seat with the combustion chamber. A control valve is positioned within the intake passage and is moveable between an opened position wherein the flow into the combustion chamber is substantially unrestricted and in a first direction and a closed position wherein the flow into the combustion chamber is restricted to increase the flow velocity and to redirect the flow from the first direction.

In accordance with a first feature of the invention, means are provided for operating the control valve between the closed position, a plurality of intermediate positions and an opened position in response to sensed engine conditions, which conditions are sensed by one or more appropriate sensors.

In accordance with another feature of the invention, means are provided for moving the control valve between the positions in response to an engine condition. A spark plug is also provided for firing a charge in the combustion chamber. Means are provided for firing the spark plug in accordance with a first timing curve when the control valve is in one of its positions and in accordance with a second, different timing curve when the control valve is not in that one position.

A further feature of the invention employs means for positioning the control valve in a position dependent upon operator demand and for positioning and retaining the control valve is one of the positions upon a sudden change in operator demand.

In accordance with another feature of the invention, means are provided for sensing an engine condition for operating the control valve between its positions. Starting means are incorporated for starting the engine and means hold the control valve in one of the positions during the operation of the starting means and independently of the engine condition sensed.

In accordance with another feature of the invention, means are provided for sensing an engine condition for controlling the position of the control valve. The control valve is held in one of its positions when the engine is stopped and regardless of the engine condition.

DETAILED DESCRIPTION OF THE PREFERRED EMBODIMENTS OF THE INVENTION

Figure 1:
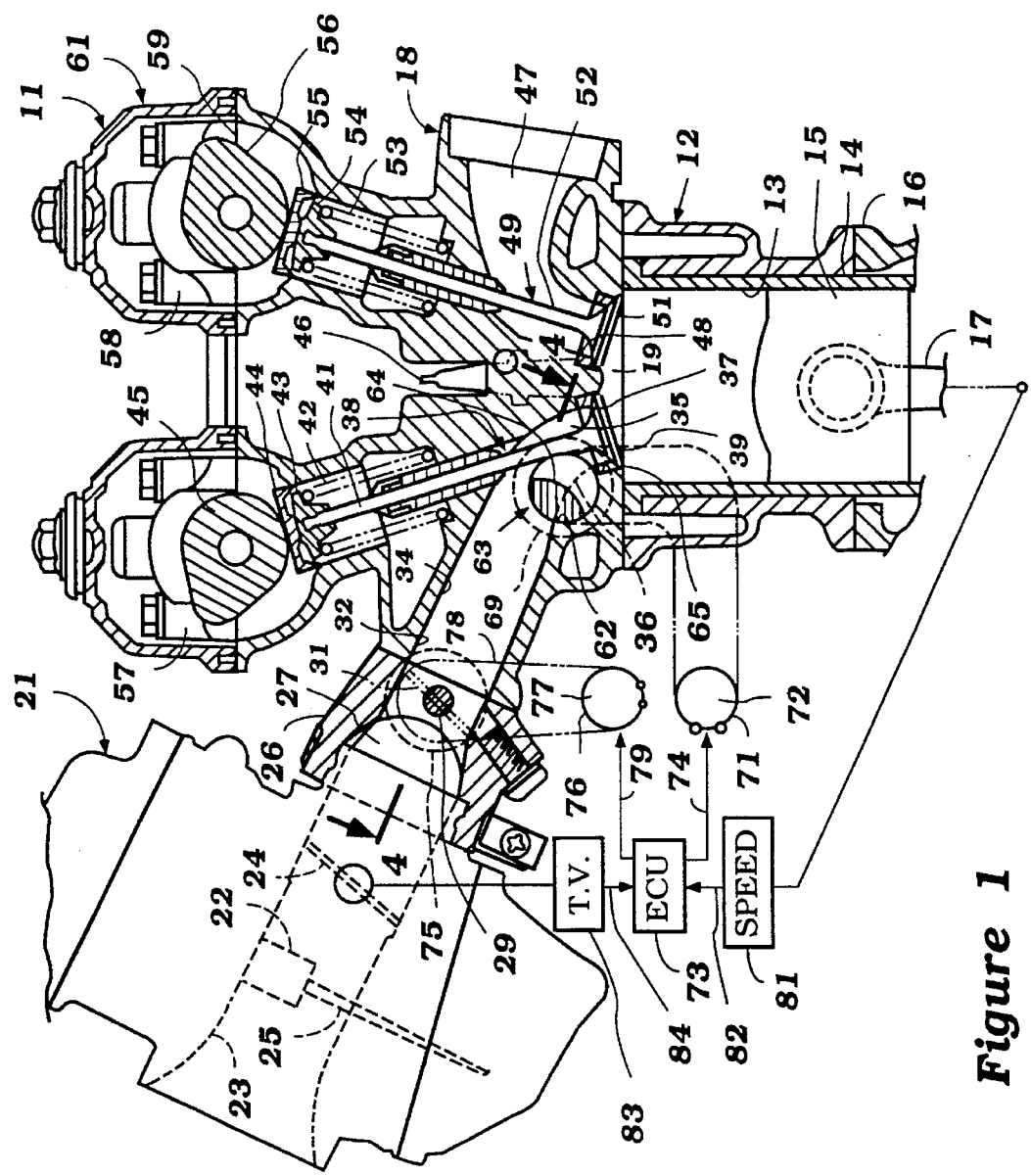
FIG. 1 is a side elevational view of a portion of an internal combustion engine having an induction system constructed and operated in accordance with an embodiment of the invention, with a portion broken away to more clearly show the construction.

Referring now in detail to the drawings and initially to FIGS. 1 through 5, an internal combustion engine constructed and operated in accordance with an embodiment of the invention is shown partially and is identified generally by the reference numeral 11. Since the invention deals generally with the induction system for the engine 11 and the method of controlling the induction system, only that portion of the engine and that portion of the induction system associated with a single cylinder of the engine 11 is depicted because it is believed obvious to those skilled in the art how to practice the invention with any type of engine and engines having any number of cylinders and any cylinder configuration. Facets of the invention also may be employed with rotary as opposed to reciprocating engines.

The engine 11 is comprised of a cylinder block 12 having cylinder bores 13 formed by pressed or cast-in liners 14. Pistons 15 are reciprocally supported in the cylinder bores 13 and connected to a crankshaft (not shown) that is rotatably journalled within a crankcase 16 by means connecting rods 17.

A cylinder head, indicated generally by the reference numeral 18 is affixed in any known manner to the cylinder block 12 and has a cavity 19 formed in its lower face for each of the cylinder bores 13 so as to form with the cylinder bores 13 and pistons 15, the respective combustion chambers of the engine.

A charge forming and induction system is provided for supplying a fuel/air charge to each of the combustion chambers 19 and this includes, in the illustrated embodiment, a carburetor 21 of the sliding piston type with the sliding piston being indicated by the reference numeral 22. This sliding piston 22 is positioned in an induction passage 23 of the carburetor 21 upstream of a manually operated throttle valve 24. A metering rod 25 is connected to the piston 22 so as to vary both the amount of fuel flowing and the effective cross sectional area of the induction passage 23 as the throttle valve 24 is opened and closed.

Figure 4:
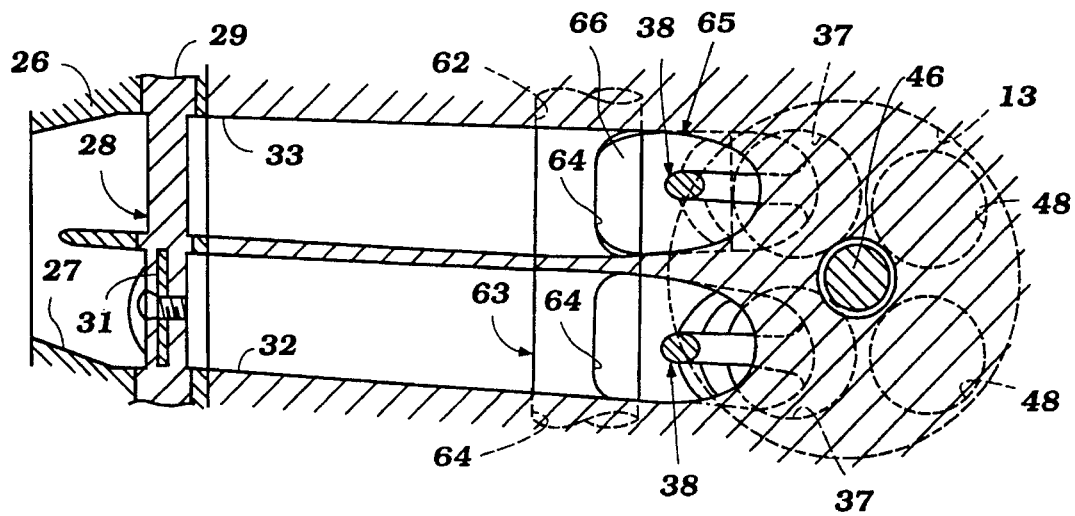
FIG. 4 is a cross sectional view taken along the line 4—4 of FIG. 1 and shows the control and throttle valves in the position shown in FIG. 1 as at low speed, low load running conditions.

Interposed between the carburetor 21 and the induction passages, to be described, of the cylinder head 18 is a throttle body 26 which is formed with a common inlet portion 27, shown in most detail in FIG. 4, in which a throttle control valve assembly, indicated generally by the reference numeral 28 is positioned. The throttle control valve assembly 28 includes a control valve shaft 29 on which one butterfly type throttle valve 31 is affixed so as to selectively open or close the flow through a secondary induction passage 32 formed in the cylinder head 18 on the intake side thereof. Parallel to the secondary induction passage 32 is a primary induction passage 33 which extends generally parallel to the secondary induction passage 32 with the induction passages 32 and 33 generally being of the same configuration having a first generally downwardly inclined portion 34 that merges into a second portion 35 that extends generally parallel to the cylinder bore axis with the portions 34 and 35 being joined by a curved bight 36. The configuration of the induction passages 32 and 33 is such that a charge entering the combustion chamber 19 through the induction passages 32 and 33 will have substantially low flow resistance and thus provide a high volumetric efficiency. However, because of this configuration, low turbulence is generated under low and mid range running conditions which can cause problems in efficient combustion, as aforenoted. A construction, which will be described, is provided for controlling the effective flow areas of the induction passages 32 and 33 and also for blocking the flow through the induction passage 32 so as to create more turbulence in the combustion chamber 19 and to provide a different flow pattern therein.

The portions 35 of the induction passages 32 and 33 terminates at respective valve seats 37 which are pressed into the cylinder head 18 in a well known manner. A pair of intake poppet valves, each indicated generally by the reference numeral 38 have respective head portions 39 that engage the valve seat 37 so as to control the flow entering the combustion chambers 19. The valves 38 further have valve stems 41 that are slideably supported within valve guides pressed into the cylinder head. Coil compression springs 42 engage keeper retainer assemblies 43 fixed to the upper ends of the valve stems 41 for urging the valves 38 to their closed positions.

Thimble type tappets 44 are slideably supported within bores of the cylinder head and engage the keeper retainers 43 for opening the intake valves 38. An overhead mounted intake camshaft 45 is journalled in an appropriate manner in the cylinder head 48 and has cam lobes that operate the thimble tappets 44 to open the intake valves 38 in a well known manner.

A charge which has entered the combustion chambers 19 from the induction system as thus far described is fired by means of spark plugs 46 mounted centrally in the cylinder head 18. The spark plugs 46 are fired by any suitable ignition system that provides timing curves, as will be described.

A pair of exhaust passages 47 are formed in the cylinder head 18 on the side opposite the induction side thus far described. The exhaust passages 47 terminate in respective exhaust valve seats 48 and the flow through them is controlled by means of a pair of exhaust poppet valves 49, each having a valve head 51 for cooperating with the valve seats 48 and a stem portion 52. The stem portions 52 are slideably supported in valve guides that are pressed into the cylinder head 18. Coil compression springs 53 engage keeper retainer assemblies 54 fixed to the valve stems 52 for urging the valves 49 to their closed positions. Thimble tappets 55 are slideably supported within bores of the cylinder head 18 and are engaged by the lobes of an exhaust camshaft 56 for opening and closing the exhaust valves 49.

The intake camshaft 45 and exhaust camshaft 56 are journalled in the cylinder head assembly 18 by means including respective bearing caps 57 and 58 which are affixed to an upwardly facing surface 59 of the cylinder head 18. The camshafts 45 and 56 are contained within a cam cover 61 that is affixed to the cylinder head 18 in a conventional manner. The intake and exhaust camshafts 45 and 56 are driven from the engine crankshaft at one half crankshaft speed, as is well known in this art.

Except for the throttle control valve 31 as thus far described, the engine 11 may be considered to be conventional. As noted, however, the induction system, although providing good efficiency for maximum speed performance, will not provide good combustion under low or mid range running due to the lack of turbulence in the combustion chamber under these conditions. Therefore, a system now to be described and which includes the throttle control valves 31 is provided for inducing turbulence and high velocity in the combustion chamber under certain running conditions.

The cylinder head 18 is formed with a transversely extending bore 62 that is disposed at the bight section 36 of the induction passages 32 and 33. A control valve, indicated generally by the reference numeral 63, has a cylindrical portion 64 that is rotatably journalled in the bore 62 and which extends across the bight section 36 of the induction passages 32 and 33. This control valve 63 is provided with a pair of cut-outs 64 which form an opening passage which has a configuration which is complimentary to and forms a continuation of the bight section 36 when the control valve 63 is in its fully opened position so as to not interfere with the flow through the induction passages 32 and 33 nor to offer any flow resistance to the flow therethrough. Thus, when tile control valve 63 is held in its opened position, as will be described, there is no flow restriction nor any flow redirection.

When the control valve 63 is rotated to its fully closed position as shown in the Figures, however, then the intake charge flowing through the induction passages 32 and 33 will be redirected toward the side of the valve seats 37 adjacent the center of the cylinder bore 13 so as to cause the intake charge to be delivered in a path shown by the broken line in FIG. 1 so as to generate a tumble action in the cylinder bore 13. This tumble action is a swirl about a horizontal rather than a vertical axis and promotes turbulence in the combustion chamber. In addition, since the effective flow areas of the induction passages 32 and 33 are reduced by the control valve 63, the velocity of the charge entering the combustion chambers 19 will be greater than if the control valve 63 were opened under this running condition and this further promotes turbulence. The increased turbulence improves fuel/air mixing and also causes a more rapid flame propagation once the spark plug 46 is fired. Thus, complete combustion will be insured due to the use of the control valves 63.

Figure 5:
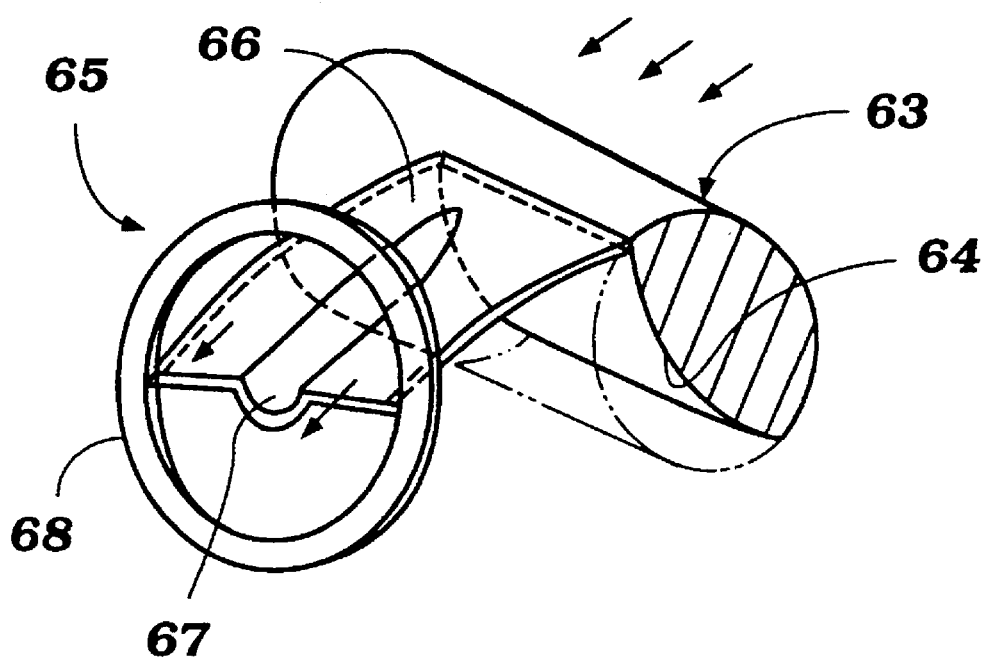
FIG. 5 is an enlarged perspective view showing how the control valve cooperates with the rectifier plate in one of the intake passages when operating at low speed and low load conditions.

To provide further augmentation, there is provided a rectifier plate assembly, indicated generally by the reference numeral 65 and having a construction which is shown in most detail in FIG. 5. This rectifier plate 65 is disposed, in the illustrated embodiment, only in the primary induction passage 33 (the one without the flow controlling throttle valve 31). The rectifier plate 65 has a curved lip portion 66 that extends into the induction passage portion 35 and across the bight 36 in generally parallel fashion so as to divide this induction passage into two portions. When the control valve 63 is in its fully closed position as shown in FIG. 5, the plate 66 will be engaged by the cut-out surface 64 and thus no flow on the opposite side is permitted. The plate portions 66 is formed with a recess 67 so as to clear the stem portion 41 of the associated intake valve 38.

The rectifier plate 65 has a ring-like base portion 68 that is received within the bore in the cylinder head in which the valve seat 37 is press fitted and thus this serves to maintain the rectifier plate 65 in its position.

Figure 2:
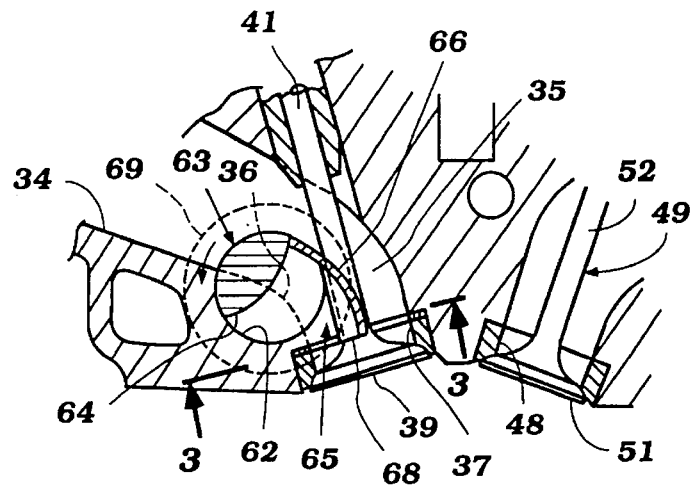
FIG. 2 is an enlarged cross sectional view taken through one of the intake valves and shows the control valve in its closed, flow controlling position.
Figure 3:
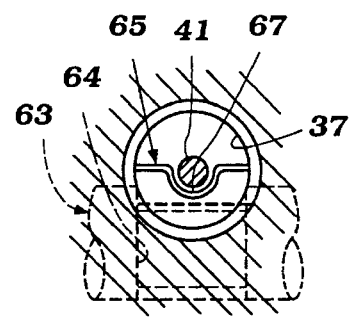
FIG. 3 ms a cross sectional view taken along the line 3—3 of FIG. 2.

The mechanism for controlling both the control valve 63 and the flow controlling throttle valve 31 will now be described, by particular reference to FIG. 1 although certain of the components for providing this actuation also appear in FIG. 2. There is provided a pulley 69 that is affixed to an exposed end of the control valve 63 and particularly its shaft portion 64. A wire actuator 71 connects this pulley to a further pulley 72 connected to a servo motor that is controlled by means of an ECU 73 through a control line 74. In a similar manner, a pulley 75 is affixed to the throttle control valve shaft 29 and is driven from a pulley 76 of a further servo motor 77 by a respective wire actuator 78. The servo motor 77 is also controlled by the ECU 73 as indicated by the schematic control line 79.

The ECU 73 receives input signals indicative of certain engine running conditions and certain other conditions, as will be described. In the illustrated embodiment, one of these conditions is a speed signal 81 which is generated from an input received from a crankshaft sensor so as to convert these sensor pulses into an indication of speed which is transmitted to the ECU 73 through a connection 82. In addition, a load input is delivered to the ECU 73 which is, in this embodiment, generated by a throttle valve position sensor 83 that outputs a signal as shown schematically at 84 to the ECU 73 which is indicative of the position of the throttle valve 24 and, accordingly, the load on the engine. As opposed to a throttle position sensor, the load signal may be delivered from an air flow sensor, induction system vacuum or any other known type of arrangement.

Figure 6:
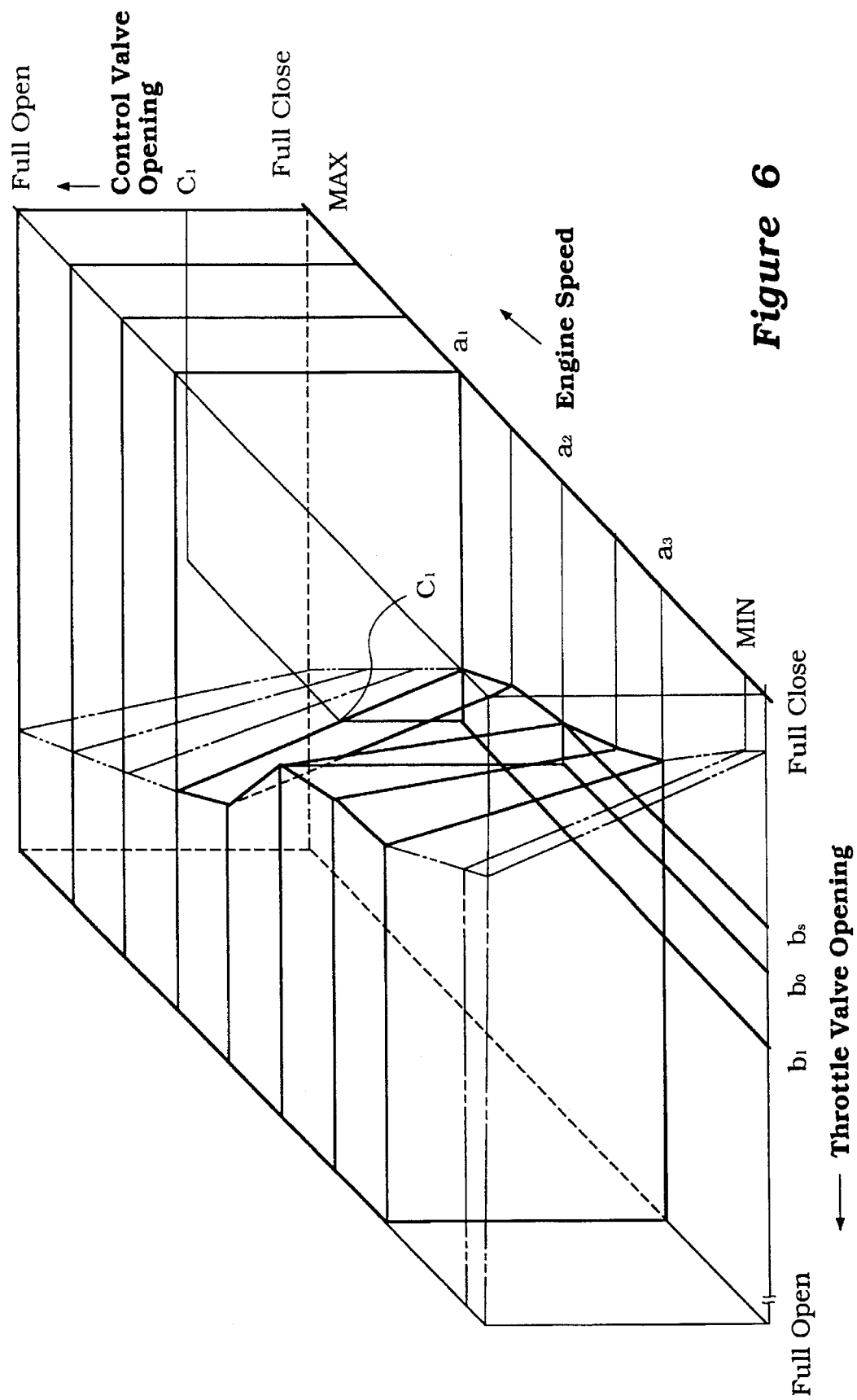
FIG. 6 is a map showing the relationship of the control valve position in response to engine speed and operator control throttle valve position.

The position of the control valve 63 as set by the ECU 73 is derived from information contained within a map, which map is shown in FIG. 6 and which is generated in a manner as will be described. This map indicates the respective positions of the control valve 63 as shown on the "Z" axis in relation to throttle valve opening as shown on the "X" axis and engine speed as shown on the "Y" axis. This map is generated so as to contain data arrived at by actual testing of an engine at each engine speed and throttle valve opening, with the control valve 61 being rotated to a position wherein maximum power is generated. It should be noted that the map of FIG. 6 is derived from an engine that preferably provides better high speed performance although the shape of the map can be altered, as will become apparent to those skilled in the art, so as to provide optimum performance under all conditions.

As an example of how the three dimensional map of FIG. 6 is generated, assuming that the engine is running at a condition wherein the throttle valve opening of the throttle valve 24 is set at the position $b_1$, which is approximately half way between fully opened and fully closed and the engine is operating at a speed al at a speed which is something greater than half way between idle and full speed operation, the control valve 63 is gradually opened from its fully closed position until a position when the maximum power output or torque is read, this being the opening $c_1$. Openings of the control valve 63 beyond the position $c_1$ at these set throttle and engine speed openings $b_1$, $a_1$, will not produce any increase in power.

That is, as the control valve 63 is opened under these conditions, the amount of tumble and velocity increase of the intake charge is gradually reduced and under these conditions, the power of the engine will gradually increase as will fuel economy. Eventually, however, there will be a point where further opening of the control valve 63 will not provide any increase in power and, accordingly, the point c1 for the position of the control valve 63 is chosen when the throttle opening is at $b_1$ and the engine speed is at $a_1$.

It should be noted that the same curve could be generated if rather than starting out with the control valve fully closed and opening it, that the procedure begin with full opening of the control valve and gradually closure of it. If this procedure would be followed, it would be found that continued closing of the control valve would not produce any decrease in engine power until the point c1 was passed and then the power output of the engine would gradually drop off.

Thus, for most operating conditions the three dimensional map is chosen by determining the condition of the control valve for given engine throttle settings and speed where the maximum power is achieved. However, there are certain engine running conditions when the control valve 63 may be maintained in its fully closed position over ranges of engine speed and throttle opening and also where the control valve 63 may be maintained in its fully opened position over ranges of engine speed and throttle opening without adversely affecting performance.

For example in a range where the engine speed is, for example, at the speed a2, there is a throttle opening $b_s$ of the throttle valve 24 below which there is no advantage to opening the control valve 63 at all because the engine power output will not be increased. That is, until the throttle opening at the speed $a_2$ reaches the throttle opening $b_s$ there is no reason to open the control valve. Hence, in the domain to the right of $b_s$ the control valve 63 is maintained in its fully closed position. Also, at the speed $a_2$ and when the throttle opening is opened to the degree $b_o$, any closure of the control valve 63 will provide an immediate drop off in power and hence for throttle openings greater than $b_o$ at the engine speed $a_2$, the control valve 63 is maintained in its fully opened position.

The characteristics of the map of FIG. 6 will depend on a number of other features such as the valve timing for the engine, the opening and closing position of the intake control throttle 31, the port configuration, etc. As has been noted, FIG. 6 is indicative of the type of map which would result in an engine that designed primarily to achieve high maximum power output. An engine that was oriented more to obtain better low and mid range speed would have a different map of course.

In addition to containing the information from the map of FIG. 6, the ECU 73 also contains information to control the timing of firing of the spark plugs 46. As has been previously noted, with conventional engines it is the practice to advance the spark timing at low speed, low load conditions to accommodate the fact that combustion takes longer under these conditions than under high speed conditions. Such conventional ignition timing further retards the spark advance as the amount of intake air increases and reaches the ideal curve when the intake air amount is high. However, since the control valve 63 is provided in this arrangement, a conventional spark timing would provide too advanced spark timing under low speed, low load conditions. Because of the use of the control valve 63, the spark timing may, at extreme low speed, low load conditions, be delayed from about 10° from the normal spark timing.

Thus, the ECU 73 is provided with not only a first ignition timing map that has the conventional engine timing for a system without a control valve, but also has a second ignition timing map which is set for the effect of the control valve 63 being in the closed or partially closed positions. There are, however, certain conditions when it is desirable to switch from the second map to the first map and some of those conditions will now be described. It will be understood that those conditions are primarily transient conditions or certain specific running conditions and under normal conditions, the second ignition timing map will be employed so as to improve fuel consumption under conditions when the intake air amount is low (engine load is low).

One specific transient condition wherein the normal spark timing curve as opposed to the second timing curve is desirable is under conditions of extreme deceleration. Under this condition, the operator may close the throttle valve 24 very rapidly so as to cause a reduction in vehicle speed but during initial closing of the throttle valve 24, the engine speed will still be quite high. Thus, because the engine speed is higher than a predetermined speed even though the throttle opening is closed, it is desirable to maintain the control valve 23 also in a fully opened position, as will be described later, even though the position of the throttle valve 24 would call for a close position of the control valve 63. Thus, although the ECU 73 would normally believe that under such a condition the control valve should be fully closed and second spark timing curve should be followed, the ECU 73 will hold the control valve 63 in its fully opened position and also will use standard ignition timing from the first timing curve. The condition of rapid throttle closing and deceleration from high speed may be sensed by either a deceleration sensor or a sensor that determines that the throttle valve 24 is being closed at a rapid speed and the engine speed is still held high. Suitably sensors and arrangements for determining such rapid deceleration are well known for other purposes.

Another case in which the ECU 73 controls the control valve 63 and ignition timing other than in response to the position of the throttle valve 24 and the engine speed solely, is a condition during cold start and warm up and if a catalytic convertor or other similar exhaust treatment device is employed for further purifying the exhaust gases issuing from the exhaust passages 47. If a catalyst is employed, it is desirable to insure that the catalyst reaches its operating temperature very quickly so as Go be fully effective. However, if the control valve 63 and spark timing are set only in response to engine running speed and throttle valve opening, then the engine will operate efficiently and there will be very little unburned fuel in the exhaust gases. Although this is normally a desirable result, when the exhaust gas temperature is lower than a predetermined value and the catalyst is, therefore, unheated it is decided by the ECU 73 that the engine is in a cold engine operation state.

Under this condition, ignition is delayed from the standard one (the second ignition map is employed) and the control valve 63 is held fully opened even through the intake air amount is low. Because of such a combined action, combustion is not as complete and there will be more unburned fuel in the exhaust gases. This will cause an afterburning effect in the exhaust pipe and the catalyst temperature to rise much more rapidly so as to function normally in a short period of time. Hence, by so varying both the ignition timing and the opening of the control valve 63 from that called for by the actual engine speed and engine load, quicker warm up of the catalyst is achieved.

A preferred sequence of operation of the air control throttle valve 31 will now be described and this operation may be considered in conjunction with the map of FIG. 6 although that map does not show the operation of the throttle control valve 31 which, as has been noted, controls the air flow through the secondary induction passage 32.

Under low speed, low load conditions and those conditions when the intake air control valve 63 is in its closed position as shown in the solid line view of the Figures, the throttle control valve 31 is also maintained in its fully closed position. As a result, the air flow into the cylinders and specifically the combustion chambers 19 takes place only through the primary induction passage 33. This provides not only the tumble action previously described, but also imparts a swirl to the intake charge about a vertically extending axis due to the fact that the primary induction passage 33 is offset to one side of the spark plug 46 as shown in FIG. 2. Hence, the motion of the intake air will be further accelerated and combustion will be improved.

When operating at the medium speed and medium load positions and the amount of intake air required is medium, the intake air control valve 63 will be rotated toward its open position in accordance with the map of FIG. 6. However, at least during this initial opening, the throttle control valve 31 is maintained either in a fully closed or a partially closed condition depending upon the degree of intake air required. Hence, there will be still some swirl in addition to tumble generated until the throttle control valve 31 is fully opened.

Under high speed, high load conditions, the control valve 63 and throttle control valve 31 are both held their fully opened position and the induction system functions that of a normal engine.

The control routine for controlling the control valve 63 will now be described by reference to FIG. 7 with additional reference to FIG. 6. However, it should be noted that before the engine is started, there is a further condition when the control valve 63 is positioned in a position that is independent of the opening of the throttle valve 24 or other load and also the speed of the engine. Note that at low throttle valve openings and low speed, the control valve 63 would normally be closed. If when the engine is shut off the control valve 63 is closed, fuel may condense in the induction passages 32 and 33 and this condensed fuel will be trapped in place in the induction passages if the control valve 63 is placed in its fully closed position, which would be normally the case with this engine condition. In order to avoid this, the ECU 73 may be programmed so as to place the control valve 63 automatically in an opened position when the engine is shut off. This can be conveniently done by sensing the condition of the ignition switch or a kill switch of the engine. However, immediately upon starting of the engine, then the control valve 63 may be moved to its closed position unless the cold starting feature for heating the catalytic convertor, as aforedescribed, is to be employed.

Alternatively to the aforedescribed control routine, the ECU 73 may be programmed to hold the control valve 63 in a fully closed position when the engine is shut off. It will also insure that the control valves will be fully opened to heat the catalyst in the event of cold starting with such an arrangement, the closure of the control valve upon the starting operation can be controlled primarily by temperature if the catalyst heating feature is to be employed.

Figure 7:
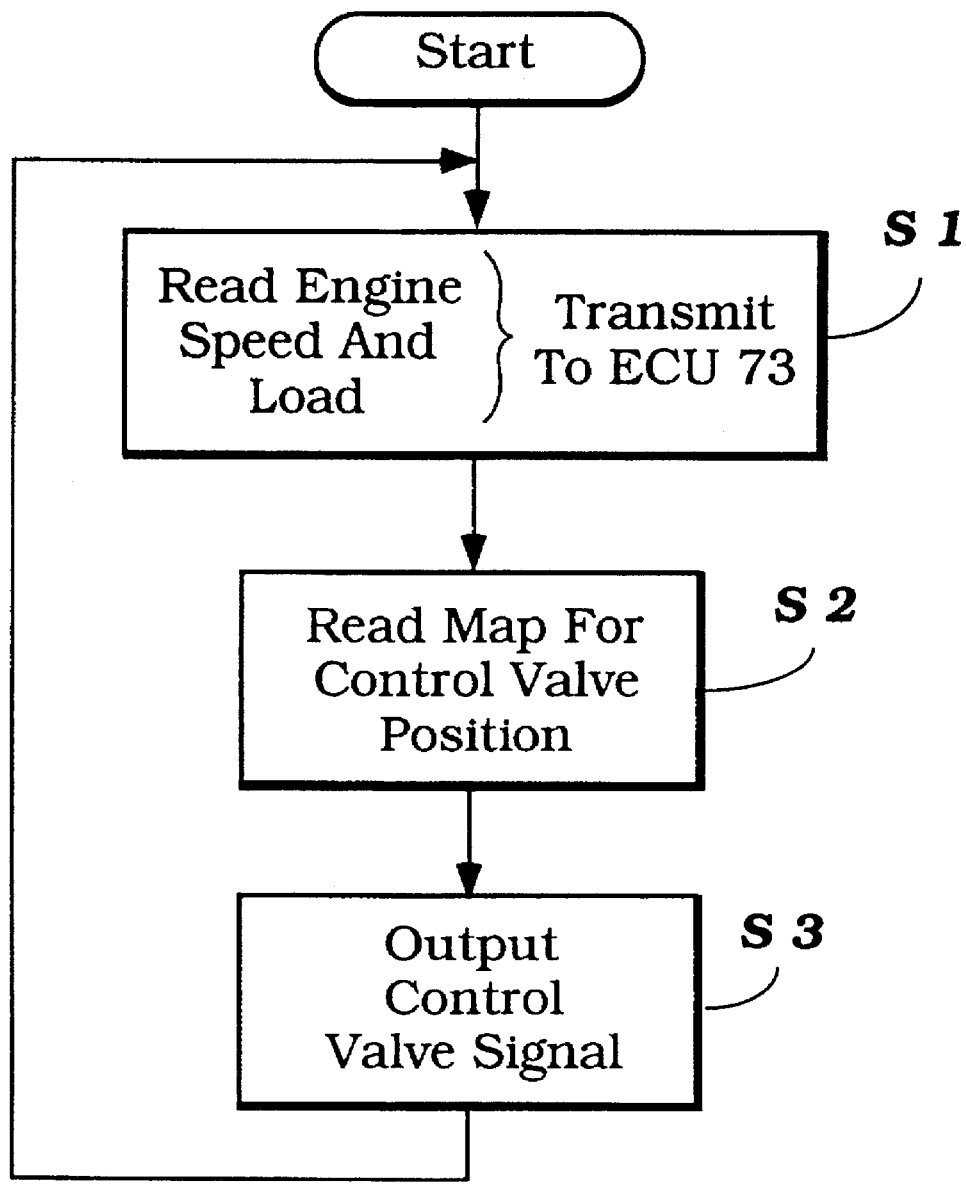
FIG. 7 is a block diagram showing the control routine for operating the control valve and automatic throttle valve.

Referring now to FIG. 7, the program begins with the engine is started and then moves to the step S1 so as to read engine speed by the sensor 81 and engine load by the throttle valve position sensor 83. As has been previously noted, other methods for sensing engine load such as air flow, manifold vacuum or the like may be employed in lieu of throttle valve position. Once these readings are taken, they are transmitted to the ECU 73, this all occurring at the step S1.

The program then moves to the step S2 where the ECU 73 reads the map of FIG. 6 and determines the appropriate control valve setting for the control valve 63. This procedure, although described generally above, will be described in some detail later.

The program then moves to the step S3 wherein the ECU 73 outputs the control valve signal through the control 74 so as to position the control valve 63 in its desired position as read from the map. The ECU also will output a signal through the line 73 to the servo motor 72 for positioning the throttle control valve 31 in accordance with a separate map for this control and as was generally described.

Referring now again to FIG. 6, it will be seen that as long as the engine speed is below a speed $a_3$, the control valve 63 is maintained in its fully closed position regardless of the condition of the throttle valve 24. This is done so as to permit the operator to blimp the throttle if he desires without causing the control valve to move back and forth. If desired, the speed $a_3$ may constitute the idle speed of the engine.

When the engine speed is above the speed $a_3$ but below the speed $a_1$, the control valve 63 is held in its closed position until the throttle valve is opened at a point which, according to the map of FIG. 6, indicates that opening of the control valve will improve the performance. This is as indicated by the boundary opening $b_s$ which varies depending upon the particular condition with $b_s$ at the engine speed of $a_2$ being indicated on the map. As may be seen in FIG. 6, the fully closed boundary opening $b_s$ is set so as to be smaller than the fully opened boundary opening $b_o$ but the curve connecting them is inclined and this inclination angle becomes greater at the higher engine speed range. This also shows that when closing the throttle valve 24 the intake air control valve 63 is closed earlier as the engine speed becomes higher and the contrary is true when opening the throttle valve. That is, under this condition the intake control valve 63 is rotated so as to open later as the engine speed becomes higher.

Both the fully closed boundary opening $b_s$ and the fully opened boundary opening $b_o$ are set to be greater as the engine speed becomes higher so as to mean that the throttle valve opening range where the intake air control valve 63 is kept fully closed is set to be wider as the engine speed becomes higher and the throttle valve opening range wherein the intake control valve 63 is kept fully opened is set narrower as the engine speed becomes higher. As has been previously noted, this is done with this particular embodiment because this embodiment is designed for engines that have their emphasis on high power, high output. Of course, these conditions can be varied depending upon the overall performance which is desired for the engine.

Also, it is desirable to minimize the movement of the control valve 63 and as long as the engine speed in this embodiment is higher than the engine speed $a_1$, then the control valve 63 will be held fully opened regardless of the actual throttle opening. This has the same benefit as keeping the intake control valve 63 fully closed when the engine speed is below the speed $a_3$. This fixed positioning of the control valve 63 under these extreme engine speed ranges minimizes the fluxuation of the operation of the control valve 63 from that which would occur if the actual curves shown on the map of FIG. 6 were to be followed rather than having the cut-off points as described.

This holding of the control valve 63 in its opened position when the engine speed is above the speed $a_1$ and regardless of the throttle opening also make sure that they control valve 63 will be opened and held open on extreme decelerations. This will improve engine performance and engine breaking while minimizing deterioration in fuel efficiency when the engine is in a breaking mode.

It should be readily apparent from the foregoing description that the described control routines are effective in providing efficient and excellent engine operation under all running conditions while accommodating certain types of transient conditions which might otherwise present difficulties. Of course, the described construction is only that of preferred embodiments of the invention and various changes and modifications may be made without departing from the spirit and scope of the invention, as defined by the appended claims.

We claim:

1. An internal combustion engine having a combustion chamber, an intake passage communicating at a valve seat with said combustion chamber, a control valve positioned within said intake passage and moveable between an opened position wherein the flow into said combustion chamber is substantially unrestricted in a first direction and a closed position wherein the flow into said combustion chamber is restricted to increase the flow velocity and to redirect the flow from said first direction, means for moving said control valve between said positions in response to engine conditions, spark plug means for firing a charge in said combustion chamber, and means for firing said spark plug in accordance with a first timing curve when said control valve is in one of its positions and in accordance with second, different timing curve when said control valve is not in said one position.

2. An internal combustion engine as set forth in claim 1 wherein the one position of the control valve is the closed position of the control valve.

3. An internal combustion engine as set forth in claim 2 wherein the first timing curve provides a retarded spark timing from the second timing curve at low speed, low load conditions.

4. An internal combustion engine as set forth in claim 3 wherein the sensed engine condition is load.

5. An internal combustion engine as set forth in claim 4 wherein the induction system is further provided with a manually operated throttle valve in said intake passage upstream of said control valve and wherein the load is determined by the position of the throttle valve.

6. An internal combustion engine as set forth in claim 3 wherein the sensed engine condition is speed.

7. An internal combustion engine as set forth in claim 3 wherein the means for sensing engine condition includes means for sensing two different engine conditions.

8. An internal combustion engine as set forth in claim 7 wherein the control valve is held in one of its positions when one of the sensed engine conditions is below a predetermined first value and regardless of the magnitude of the other sensed engine condition.

9. An internal combustion engine as set forth in claim 8 wherein the control valve is held in the other of its positions when the one condition is above a second predetermined condition and regardless of the value of the other condition.

10. An internal combustion engine as set forth in claim 9 wherein the one condition is speed.

11. An internal combustion engine as set forth in claim 10 wherein the control valve is held in a closed position when the engine is below a first predetermined engine speed.

12. An internal combustion engine as set forth in claim 11 wherein the control valve is held in its open position when the speed of the engine is greater than a second predetermined engine speed.

13. An internal combustion engine as set forth in claim 12 wherein the other engine condition is load.

14. An internal combustion engine as set forth in claim 13 wherein the induction system is further provided with a manually operated throttle valve in said intake passage upstream of said control valve and wherein the load is determined by the position of the throttle valve.

15. An internal combustion engine as set forth in claim 13 wherein load is sensed by determining the air flow to the engine.

16. Am internal combustion engine as set forth in claim 13 wherein the load is sensed by sensing the pressure in the intake passage.

17. An internal combustion engine as set forth in claim 7 wherein one of the sensed conditions is operated demand.

18. An internal combustion engine as set forth in claim 3 wherein the engine is provided with an exhaust system having a catalytic device.

19. An internal combustion engine as set forth in claim 18 wherein the control valve is held in its opened position upon starting and if the temperature of the catalytic device is below a predetermined temperature.

20. An internal combustion engine as set forth in claim 19 wherein the first timing curve is employed for setting the spark timing when the control valve is held in its open position upon starting and if the temperature of the catalytic device is below the predetermined temperature.

* * * * *